United States Patent [19]

Gröbli et al.

[11] 4,226,578

[45] Oct. 7, 1980

[54] PELLET MILL

[75] Inventors: Werner Gröbli, Flawil, Switzerland; Peter Zimmermann, Johannesburg, South Africa

[73] Assignee: Gebrüder Bühler AG, Switzerland

[21] Appl. No.: 3,766

[22] Filed: Jan. 15, 1979

[30] Foreign Application Priority Data

Dec. 4, 1978 [DE] Fed. Rep. of Germany ....... 2852420

[51] Int. Cl.[3] .............................................. B29F 3/01

[52] U.S. Cl. .................................... 425/186; 425/190; 425/193; 425/461

[58] Field of Search ................ 425/461, 190, 186, 193

[56] References Cited

U.S. PATENT DOCUMENTS

| | | | |
|---|---|---|---|
| 2,177,132 | 10/1939 | Crabtree | 425/193 |
| 3,559,238 | 2/1971 | Gilman | 425/186 |
| 3,702,751 | 11/1972 | Mehnert | 425/190 |

FOREIGN PATENT DOCUMENTS

| | | |
|---|---|---|
| 1164736 | 3/1964 | Fed. Rep. of Germany . |
| 2108326 | 9/1971 | Fed. Rep. of Germany . |
| 2756647 | 11/1978 | Fed. Rep. of Germany . |

*Primary Examiner*—Jeffery R. Thurlow

[57] ABSTRACT

A cylindrical die for a pellet mill for animal feedstuffs is releasably clamped to a rotatable die holder by means of a series of clamping segments disposed in a recess at the end face of the die holder. The recess has a radially outer conically diverging surface which cooperates with conically shaped outer surfaces on the segments to produce clamping of the radially inner faces of the segments on an end portion of the die.

The clamping segments are urged into engagement by springs acting on rods connected to the segments and are disengagable by means of a series of hydraulic rams which can be actuated to oppose the force of the springs. The direction of the forces is chosen to be at an angle to the axis of the die holder so as to cause the clamping segments to follow the surface of the recess and to move radially away from the die during disengagement. The angle chosen is preferably the angle of divergence of the recess. In a modification centering segments are interdigitated with the clamping segments.

30 Claims, 8 Drawing Figures

PELLET MILL

Figure 1:
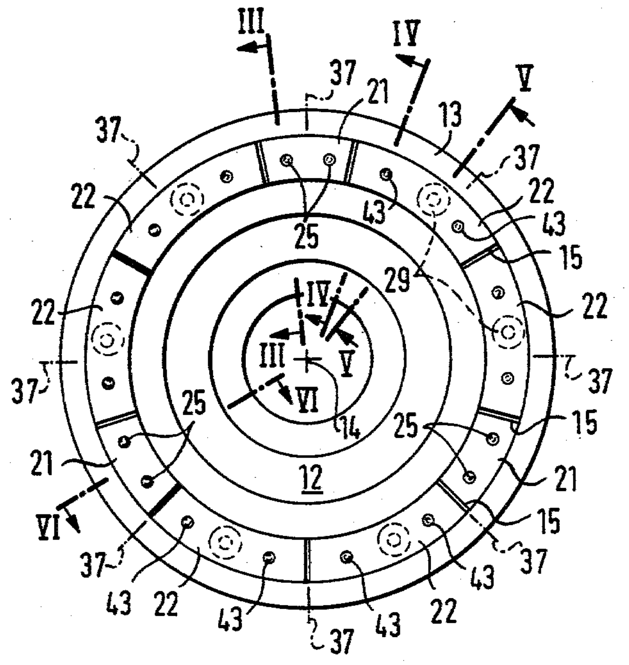

The present invention relates to a pellet mill for extruding plastic masses such as animal feed stuffs into pellet form and has particular reference to a pellet mill of the kind in which a cylindrical pellet die is releasably clamped to a rotatable die holder and in which at least one excentrically mounted roller is provided within the cylindrical pellet die so that, on rotation of the die and die holder, relative rolling movement of the roller along the inner surface of the die is produced to extrude the plastic mass through radial bores provided in the cylindrical wall of the die.

In using machines of this kind it is necessary to periodically change the cylindrical die and, because of the relatively large forces involved a fairly substantial connection is required between the die and the die holder which not only clamps the two together axially but also ensures concentricity of the two components and allows the transmission of torque between the two components.

In one known arrangement disclosed in German Auslegeschrift DE-AS No. 21 08 326 there is provided means for releasably clamping a die concentrically with the end face of the die holder comprising an annular step recess at the end face of the die in which the radially outer surface of the annular step recess diverges conically outwardly in the direction of the die and defines a guiding surface. A series of peripherally spaced apart clamping segments are interposed between the guiding surface and the periphery of the die and the radially outer and inner surfaces on the clamping segments respectively match the conically divergent form of the guiding surface and the curvature of a flange at the end portion of the die. Spring means are provided in order to urge the clamping segments into clamping engagement with both the guiding surfaces and further auxiliary release means are also provided, which can be actuated to generate forces which oppose the forces generated by the spring means, so as to be able to disengage the clamping segments from the die and subsequently to be able to remove the die.

In this known arrangement the clamping segments are connected via axially aligned rods passing through respective bores provided in a flange at the end face of the die holder to a ring member located behind the flange. Spring means are interposed between the flange on the die holder and the ring and the auxiliary release forces are generated by means of hydraulic rams arranged to push the ring forwardly against the force of the springs to dislodge the clamping segments. The alignment between the spring force and the auxiliary release force is such that substantially no bending moments are applied to the rods which could result in loading and wear of the guides.

Because of the axial movement of the clamping segments, which arises because of the axial alignment of the rods, the clamping segments will leave the conical guiding surface of the annular recess thus relieving, at least partially the radial clamping load on the die and allowing the die to be removed from the die holder. A new die can then be engaged with the die holder. During this operation the die is centered relative to the die holder by centering segments fixed relative to the die holder. After removing the oil pressure behind the hydraulic rams the spring means then draws the clamping segments into position to secure the new die in place. It is however disadvantageous that the clamping segments have to be moved radially outwardly after they have been disengaged from the guiding surface in order to allow the die to be readily removed or to allow a new die to be introduced.

In order to avoid this disadvantage it is also known from German Offenlegungsschrift No. 27 56 647 to provide the rods, or bolts, which guide the clamping segments with a conical part which bears on a fixed journal located within the die holder. The effect of the cooperation between the journal and the conical part of the rod is to produce a radially outward movement of the clamping segments at the same time as the auxiliary release force produces an axial disengaging movement thereof. In this way the clamping of the clamping segments on the die itself is automatically removed. On replacing a die the reverse process occurs when the auxiliary force is removed. It is however disadvantageous that this known arrangement firstly requires a special construction of the rods or bolts which guide the movable clamping segments and furthermore that special guiding journals are required in the die holder itself. Moreover the deflection which takes place on movement of the clamping segments results in wear at the contact surfaces between the guiding journals and the rods so that the device should be periodically readjusted.

It is a prime object of the present invention to provide a pellet mill of the kind previously described in which the clamping segments are compulsorily lifted away from the clamped die on actuation of the auxiliary release force to disengage the clamping segments without requiring a large constructional effort which is both complicated and expensive and without having to tolerate special loads and wear on the guiding members.

Simultaneously it is a further object of the invention to obtain a safe and trouble free centering and clamping of the die during operation of the pellet mill.

Other important objects and advantages of the present invention will become apparent from the subsequent disclosure.

In accordance with the present invention there is provided a pellet mill for extruding plastic masses and including a cylindrical pellet die, a rotatable die holder, and means for releasably clamping the die concentrically with an end face of the die holder, said means comprising an annular step recess at the end face of the die holder for receiving the end face of the die, the radially outer surface of the annular step recess diverging conically outwardly in the direction of the die and defining a guiding surface, a series of peripherally spaced apart clamping segments interposed between said guiding surface and the periphery of said die, the radially outer and inner surfaces of the clamping segments respectively matching the conically divergent form of the guiding surface and the curvature of the end face of the die, spring means adapted to urge the clamping segments into clamping engagement with both said guiding surface and said die and auxiliary means actuatable to generate forces to oppose the forces generated by said spring means for disengaging said clamping segments, both the forces generated by said spring means and said auxiliary means being directed at angles $\alpha$ to the rotational axis of the die holder which lie generally within the angle of divergence of said guiding surfaces to produce radially outward movement of the clamping segments on disengagement thereof, means being provided for transmitting said spring and auxiliary forces to the clamping segments said means being adapted to allow movement of the clamping segments in the direction of these forces.

Thus, in accordance with the present teaching the line of action of the forces on the clamping segments and thus also the similarly directed movement of the clamping segments is not parallel to the rotational axis of the die holder, but rather at a significant angle to the rotational axis of the die holder, so that on disengagement of the clamping segments they receive a notable component of movement at right angles to the rotational axis and thus lift free from the outer surface of the die. As the forces and movements are similarly directed even the frequent changing of dies does not result in wear of the components.

One result of moving the clamping segments out of engagement in a direction which is inclined to the rotational axis is that a mismatch occurs between the curvature of the outer surface of the clamping segments and the curvature of the annular recess. This result is especially pronounced when the segments are moved at the largest possible angle which generally corresponds to the semi-cone angle of the guiding surface (which is the preferred angle of movement). Thus, strictly speaking only a generatrix of the clamping segment and a corresponding generatrix of the conical guiding surface can remain in contact with each other. However, during the first part of the disengaging movement of the clamping segments the difference in curvature remains so small that the clamping segments contact the outer guiding surface over a relatively large surface area. Strictly theoretically taken however only line contact is achieved between the two generatrices. It is thus desireable for the guiding means which transmits the forces to the clamping segments to be so constructed that the generatrix at which line contact occurs is located at the centre of the periphery of the clamping segment. In this way the largest possible radial clearance is achieved between the clamping segments and the die surface during disengaging movement of the clamping segments.

In order to achieve a sufficient radial movement of all parts of the clamping segments away from the die each clamping segment should subtend an angle of less than 90° at the rotational axis of the die holder. It is however useful if each of the clamping segments subtends an angle in the range 30° to 60° at the rotational axis of the die holder, an angle in the range 40° to 50° being better and an angle of substantially 45° being preferred.

In order to achieve a uniform clamping of the die the clamping segments are usefully uniformly arranged around the periphery of the die.

In order to prevent each of the clamping segments from rotating during disengagement each clamping segment is preferably guided by two guiding members which contact the clamping segment at two points respectively located one to either side of its centre. The auxiliary force is then desirably chosen to act at the middle of the imaginary straight line connecting these two points.

The guiding members preferably run in associated bores provided in the end face of the die holder and are arranged on a common surface of cone angle $\alpha$ and thus, to avoid jamming in the guides during disengaging movement of the segments, it is necessary to provide a small amount of play between the guiding members and the guide bores.

An especially practical embodiment of the present teaching is achieved when the means for transmitting the forces generated by said spring means to the clamping segments comprises the guiding members, the guiding members being connected to the clamping segments and passing at the angle $\alpha$ through the afore-mentioned corresponding bores provided in the die holder, there being a sufficient clearance between the members and the bores to avoid binding of the members in the bores and said spring means comprising springs interposed between the die holder and abutments provided on the guide members. Each of the guide members preferably comprises a bolt the head of which defines the said abutment. If desired a cylindrical sleeve passing over the shank of the bolt can be clamped between the head of each of the bolts and its associated clamping segment.

It is particularly useful if the springs are compression coil springs arranged coaxially with the guiding members.

It is particularly useful if the auxiliary release forces are generated via hydraulically operated rams. In one embodiment the auxiliary means comprises a respective hydraulically actuated ram in respect of each clamping segment, the rams being arranged in respective cylinders fixedly arranged relative to the die holder and inclined at the angle $\alpha$ to the rotational axis thereof. In this way, not only can mechanical intermediate transmission members be avoided between the device for generating hydraulic force and the clamping segments but moreover each of the hydraulic rams can be individually adjusted to the desired angle relative to the rotational axis of the die holder.

In an advantageous modification the surface of each clamping segment facing its associated hydraulic ram is provided with a recess with an inclined rear face in order to provide a flat abutment surface for the flat front side of the ram.

The simultaneous charging of all hydraulic cylinders with pressurized hydraulic liquid is preferably achieved by connecting all the hydraulic cylinders to a common ring duct which is connectable to a common pressure source.

It is also possible to provide a few axially directed safety screws between the die and the die holder. These screws are however not to be compared with the previous customary fastening screws because they are solely intended to provisionally assist in the mounting of the die until the clamping segments are engaged, at which time the actual securing forces particularly in the radial direction are predominantly provided via the engaged clamping segments. For these reasons it is sufficient if only two auxiliary safety screws are arranged at two diametrically opposite positions.

In accordance with an advantageous modification the length of the generatrix for the conical outer surface of the clamping segments is made longer than that for the cylindrical clamping surface on the die. In this way those surfaces of the clamping segment which are displaced parallel to other surfaces during disengagement are relatively larger than the actual clamping surface which results in an improvement in the guiding of the clamping segments. In accordance with an especially preferred embodiment the end face of the die holder includes an annular flange member which defines said annular step recess, the flange member being concentrically located on an annular end portion of said die holder by means of centering segments respectively located between at least some of the clamping segments, the centering segments having radially outer and inner surfaces respectively matching the conically divergent form of the guiding surface and the curvature of said annular surface there being further provided spring means for urging the centering segments into locating engagement with both said guiding surface and said annular surface.

In the engaged position the conical outer surfaces of the centering segments are in intimate engagement with the conical guiding surface on the flange. This embodiment of the centering segments assists in initially centering the die with respect to the die holder.

The centering segments are usefully guided in the same manner as the clamping segments and the spring means utilized to engage the centering segments is preferably similar or identical to that used for the clamping segments. A hydraulic device for compressing the springs which engage the centering segments is however not necessary because the centering segments together with the annular flange form a permanent fitment and should always remain in the same position.

The centering segments are also usefully uniformly arranged about the periphery of the annular step recess. The centering segments are arranged to overlap the end face of the die and are spaced therefrom by only a small radial clearance for example 2/10 of a millimeter which allows the die to be pushed into position without effort but without too much play. The centering segments and the flange thus have an additional function of producing an initial centering of the press form quite independently from the clamping segments. The clamping segments do not in principle need to be moved further away from the die than the clearance which exits between the centering segments and the die so that a guiding surface for the introduction and centering of the die is present all around the annular recess (apart from the clearances that are provided between the individual segments). Preferably however the clamping segments are spaced, in their disengaged condition, somewhat further from the die than the centering segments to take account of unavoidable manufacturing tolerances.

Each centering segment can usefully subtend an angle from 20° to 30° and preferably substantially 25° at the rotational axis of the die holder. Advantageously a total of three centering segments are uniformly spaced around the periphery of the annular recess.

Two clamping segments are usefully disposed between each adjacent pair of centering segments.

It is especially advantageous if the annular step recess, the guiding members and if desired the hydraulic cylinders are arranged in an annular flange surrounding the die holder which is constructed in the form of the wear reducing ring known from German Pat. No. 1,164,736. In this arrangement the wear reducing ring or flange is secured additionally to the die holder by radial bolts which considerably reduce the wear taking place on the die due to the changing radial forces involved in operation of the mill.

In order to avoid the clamping segments being released, for example due to undesired heating of the oil in the hydraulic cylinders, there is provided a clearance between the rams and the clamping segments. A certain amount of expansion of the oil and associated displacement of the rams will thus not result in disengagement of the clamping segments.

It will be further appreciated that, whilst the preferred embodiment is for the guiding members and guides to be aligned with respective generatrices of a cone surface as this simplifies the manufacture of the individual parts, it is also possible for the guiding members in respect of one segment to lie parallel to one another in one plane but for this plane to intersect with the rotational axis of the die at the angle $\alpha$. The claims will be understood to cover also this case.

Figure 2:
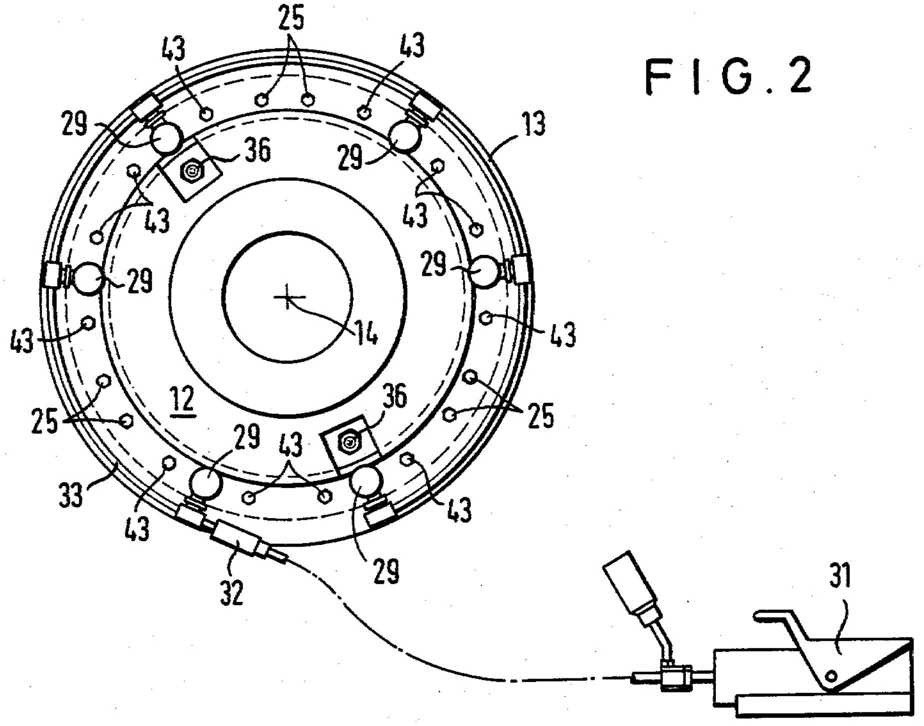
Figure 3:
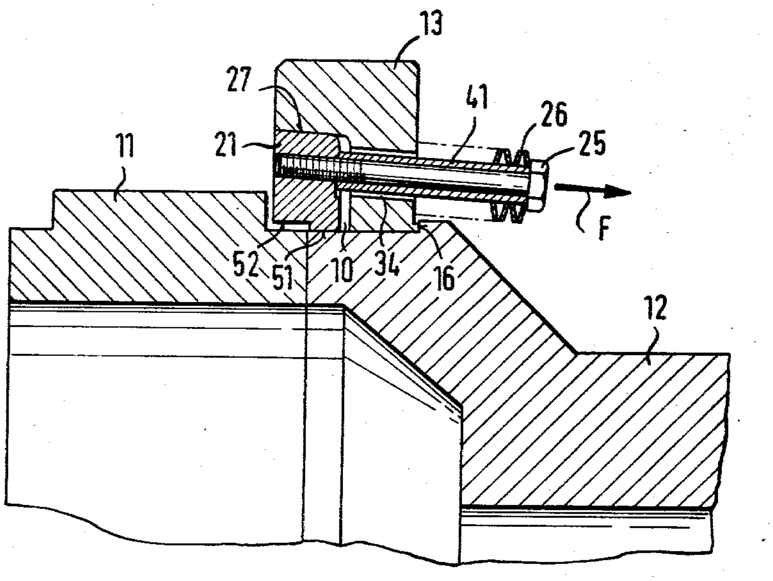
Figure 4:
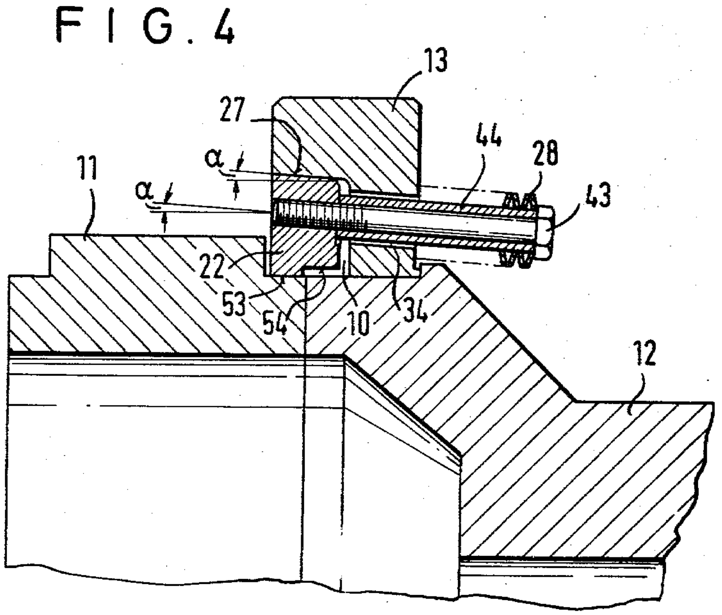
Figure 5:
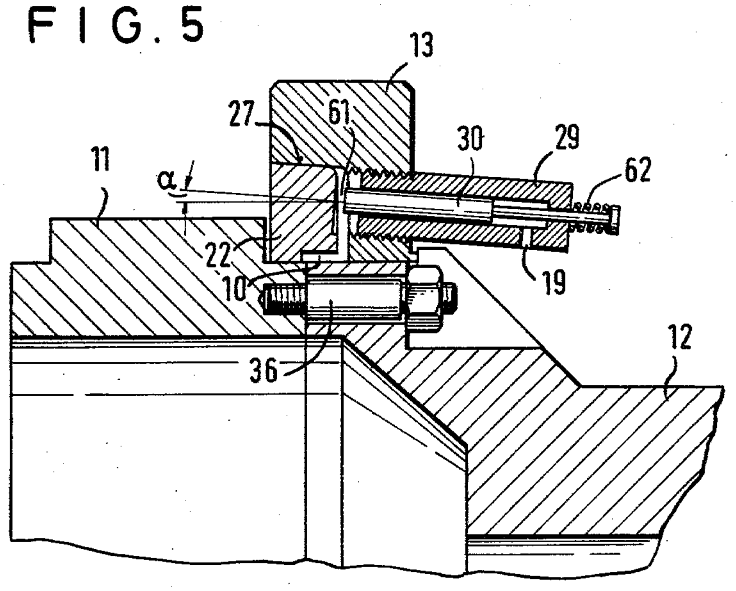
Figure 6:
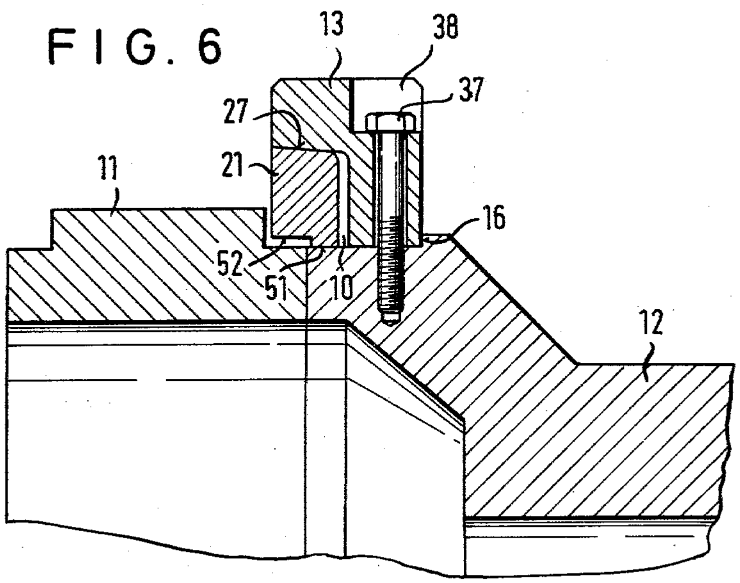

An embodiment of the invention will now be described in more detail by way of example only and with reference to the accompanying drawings in which are shown:

FIG. 1 a front elevation of a die holder as seen from the side on which the die is mounted, FIG. 2 a rear view of the die holder of FIG. 1 together with a schematically illustrated pressure source, FIG. 3 an enlarged partial axial section on the line III—III of FIG. 1, however showing the die engaged in its operative position, FIG. 4 an enlarged partial axial view along the line IV—IV of FIG. 1, however showing the die engaged in its operative position, FIG. 5 an enlarged partial axial view along the line V—V of FIG. 1, however showing the die engaged in its operative position, FIG. 6 an enlarged partial axial section along the line VI—VI of FIG. 1, however showing the die engaged in its operative position.

Figure 8:
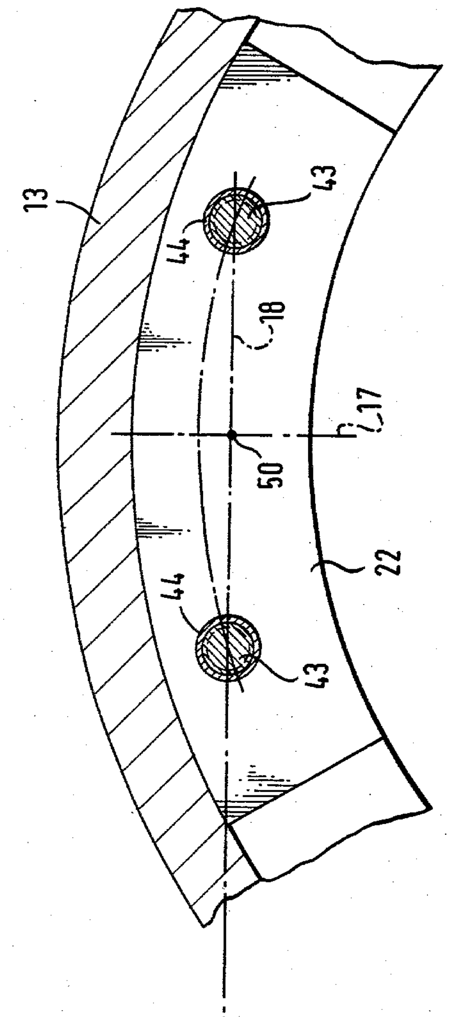
Figure 7:
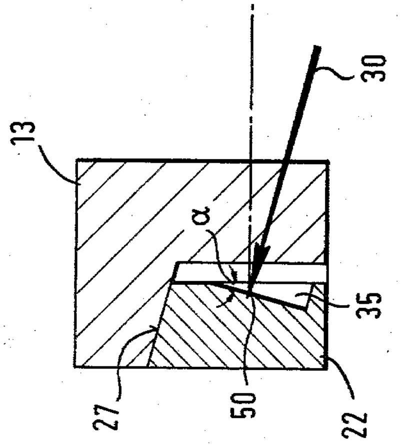

FIG. 7 an enlarged section of FIG. 5 illustrating an especially preferred construction for the surfaces of the clamping segments, and FIG. 8 an enlarged view of a clamping segment engaged in a wear prevention ring illustrating a detail of the mechanical arrangement.

Referring first of all to FIGS. 1 to 4, there can be seen a die holder 12 rotatable around its axis 14 and which is adapted to receive a cylindrical pellet die 11 for extruding plastic masses of animal food into pellet form. As is usual in such pellet mills at least one excentrically mounted roller would be located within the cylindrical pellet die 11 so that, on rotation of the die holder the roller effectively rolls around the internal periphery of the die and extrudes the animal food stuff through radial bores provided therein. The detail construction of the extrusion part of the pellet mill is not relevant to the present invention and will thus not to be discussed in further detail.

From the figures and especially FIGS. 3 and 4 it can be seen that a flange ring 13 is provided at the end face of the die holder 12 and is connected thereto. The annular step recess 10 is formed in the flange ring and is thus provided at the end face of the die holder. The forward edge of the flange ring 13 projects slightly beyond the end face of the die holder part 12. The recess so formed is thus adapted to receive the end portion of the die 11. The die 11, as will now be explained in more detail, is releasably clamped concentrically with the end face of the die holder. The flange ring 13 is, as can be seen from FIGS. 1 and 6 fastened to the periphery of the die holder via eight radially directed screws 37 and the heads of these screws 37 are located in recesses 38 provided in the external surface of the flange ring. The flange ring shown is intended to have the wear prevention properties of the equivalent ring shown in the afore-mentioned German Pat. No. 1,164,736.

The radially outer surface of the annular step recess diverges conically outwardly from the die holder in the direction of the die and defines a guiding surface 27. The cone angle of the guiding surface is designated in FIGS. 4 and 5 by the angle $\alpha$ and is usefully chosen to lie in the range of from 5° to 15°.

A series of periphery spaced apart clamping segments 22 are arranged around the periphery of the annular step recess and the radially outer and inner surfaces of the clamping segments are arranged to match, in the engaged position of the segments, the conically divergent form of the guiding surface and the curvature of the end portion of the die. Spring means, in the form of a series of plate springs 28 loaded under compression urge the clamping segments 22 into engagement with both the guiding surface and the end portion of the die so that the die 11 is squeezed uniformly radially inwardly around its periphery and is thus located against rotation relative to the die holder 12.

Auxiliary means which can be seen from FIG. 5 and which will be described later in more detail is provided to enable the clamping segments to be disengaged and is actuatable to generate forces opposed to and greater than the force of the spring means to enable the clamping segments to be disengaged.

As can be seen from FIG. 1 centering segments 21 are periodically interdigitated between the clamping segments 22 in a specified manner. The construction and manner of operation of centering segments 21 can be seen from FIGS. 1 and 3. In total there are three centering segments 21 arranged around the periphery of the annular step recess 10 and each subtends an angle of substantially 25° at the rotational axis of the die holder.

As can be seen from FIG. 3 the centering segments 21 are located in the illustrated engaged position with their end faces adjacent the die lying flush with the end face of the flange ring 13. In this position the radially outer curved surface of the centering segments 21 lie in intimate contact with the complementary conically outwardly diverging surface 27 of the annular recess.

Whilst the centering segments 21 are provided with a recess 52 of approximately 1 2/10 mm radial depth at the regions at which they surround the die 11—in order to provide a constant small clearance from the die 11—their radially inner surfaces 51 lie in close and intimate engagement with the corresponding annular surface of the end face of the die holder 12. Two guiding members act on each of the centering segments to urge them into intimate engagement with the flange ring and die holder by means of the further spring means 26. The arrangement is such that two bolts 25 pass through bores provided in the rear face of the flange into engagement with the centering segments 21 and the springs 26, in the form of plate springs, are arranged coaxially between the rear face of the flange ring 13 and abutments provided by the heads of the bolts 25. Distance pieces 41 in the form of cylindrical sleeves surround the shanks of the bolts 25 and cooperate with the corresponding bores in the flange ring to define guiding members and guides for the centering segments 21. The bores 34 pass through the flange ring at an angle such that the axis of each bore is inclined to the rotational axis of the die holder 12 at an angle $\alpha$ which is the same as the divergence angle of the guiding surface 27. The axes of the bolts 25 can thus be imagined as lying on the surface of a cone of included angle $2\alpha$, the bolts being aligned with generatrices of the cone surfaces.

The springs 26 generate sufficient tension in the shanks of the bolts 25 to draw the centering segments along the guiding surface 27 into the engaged position in which they are compressed between the guiding surface 27 and the annular end surface of the die holder. In this way the centering segments help to locate the guiding surface 27 concentrically with the rotational axis of the die holder. A step 16 formed on the end of the die holder provides a secure abutment for defining the axial position of the flange ring 13.

As can be seen from FIG. 1, two clamping segments 22 are arranged between each neighbouring pair of centering segments 21 and each of the clamping segments 22 subtends an angle at the rotational axis of the die holder of substantially 45°.

It is important that the clearance 15 be provided between all the adjacent segments 21 and 22 so that, in the fully engaged position of the clamping segments, the clamping segments can atmost lightly contact the neighbouring segments. As can be recognized from FIGS. 1 and 4 the clamping segments 22 are basically similarly constructed to the centering segments. They have however radial recesses 54 adjacent the die holder 12 so that they do not contact the annular surface of the end of the die holder. However the radially inner surfaces of the clamping segments 22 are provided with cylindrical clamping surfaces 53 immediately in front of the die holder by means of which they can clamp on the die 11 in their engaged position. It will be noted from the illustration of FIG. 4 that the clamping segments 22 are also arranged so that their end faces lie flush with the end face of the flange ring 13 when in the engaged position.

Set bolts 43 with distance pieces 44 arranged similarly to the bolts 25 and the cylindrical sleeve distance pieces 41 of FIG. 3 take over the guidance of the clamping segments 22.

As before the bores 34 provided in the flange ring are inclined at an angle $\alpha$ to the axis of rotation of the die holder and the bolts 43 can be imagined to lie along the generatices of the surface of a cone of included angle $2\alpha$. Once again the action of a set of plate springs 28 generates a force directed along the axis of the bolts 43 to urge the clamping segments into clamping engagement.

As can be seen from FIGS. 1 and 8 each clamping segment 22 is guided, in similar fashion to the previously discussed centering segments 21 by means of two of the bolts 25 disposed one to either side of the center 17 of the segment. As before the cylindrical sleeves 41 or, if the sleeves are omitted the shanks of the bolts 25, form guidance members which cooperate with guides defined by the bores 34 in the flange ring to guide the movement of the clamping segments 22.

As can be seen from FIGS. 7 and 8 a recess 50 is provided at the centre of the imaginary connecting line 18 (FIG. 8) which interconnects the two points on each clamping segment at which the associated bolts 43 are connected. The bottom surface of this recess is inclined so that it forms an abutment surface 50 for the ram 30 of the hydraulic cylinder 29 shown in FIG. 5. The angle $\alpha$ at which the bottom surface of the recess is inclined is the same as the cone angle of the guiding surface. Each of the cylinders 29 is correspondingly arranged with its axis at an angle $\alpha$ to the rotational axis of the die holder 12 and aligned with a generatix thereof. In the engaged position of the clamping segments there is a clearance 61 between the end of the ram 30 and the abutment face 50 on the rear face of the clamping segment 22. This clearance 61 is maintained by means of respective resetting springs 62 which urge the rams of the hydraulic cylinders rearwardly. It is important for the hydraulic cylinder 29 and also the two bolts 43 arranged to either side of the hydraulic cylinder to be arranged on a cone surface concentric with the rotational axis 14 of the die holder and having a cone angle α. In order to avoid jamming of the cylindrical sleeves 44 in the bores 34 on disengaging movement of the clamping segments there is provided a suitable clearance between the cylindrical sleeves 44 and the bores 34.

As can be seen from FIGS. 2 and 5 the die 11 and the die holder 12 can be additionally connected together by two diametrically oppositely arranged safety fasteners 36.

The inlets 19 (FIG. 5) to the individual hydraulic cylinders 29 are conveniently connected, as seen in FIG. 2, to a common ring duct 33 which can be connected to a pump 31 via a releasable connection 32.

Prior to assembling the die 11 to the die holder the clamping segments 22 are disengaged by connecting the pump 31 via the releasable connection 32 to the ring duct 33 and actuating the pump so as to move the clamping segments to the left as seen in FIG. 5. During this operation the clamping surface 53 (of FIG. 4) is caused to move radially away from the end portion of the die 11 because both the forces generated by the spring means 28 and the auxiliary release means 30 are directed at angles α to the rotational axis of the die holder and the guiding members for transmitting the spring and auxiliary forces to the clamping segments are adapted to allow the clamping segments to move in the direction of these forces. The die 11 can then be introduced axially between centering and clamping segments 21, 22.

First of all the safety fasteners 36 are engaged and tightened so that it is absolutely certain prior to engaging the clamping segments 22 that the die 11 is correctly abutted against the end face of the die holder. The safety fasteners 36 however are only a provisional and temporary securing means for ensuring the correct position of the die 11 on the die holder 12. If now the pressure is released from the hydraulic cylinders 29 the plate springs 28 engage the clamping segments into the position shown in FIGS. 4 and 5 in which the clamping surfaces 53 clamp the end portion of the die 11. By the engaging movement of the clamping segments 22 the loads generated by the safety fastenings 36 especially in the radial direction are extensively relaxed. The safety fastenings however maintain their safety function to cover the eventuality of the clamping segments unintentionally being disengaged, for example through failure of the spring means.

The releasing of the die 11 is achieved by reversing the series of events, by applying pressure to the ring duct 33 and displacing the rams 30 together with the clamping segments 22, the safety screws 36 can have been previously released as they will in any case have been partially unloaded by the action of the clamping segments 22.

The resetting springs 62 ensure that the rams adopt an inoperative position once the pressure in the ring duct has been released, so that the clearance 61 is present between the clamping elements 22 and the front face of the ram.

It will be appreciated that the angle α at which the guiding members guide the clamping segments α will always produce some radially outward movement of the segments when α is greater then 0°. It will generally however not be sensible to increase the angle above half the value of the cone angle for the conically divergent guiding surfaces as this would produce increased friction at the guiding surface. The angle α should thus be chosen to lie within the angle of divergence of the guiding surface, i.e. in the range from 0 up to this angle. It will generally be practical to choose α equal to the angle of divergence as then the component of force producing radial displacement is at its largest.

We claim:

1. A pellet mill for extruding plastic masses and including a cylindrical pellet die, a rotatable die holder, and means for releasably clamping the die concentrically with an end face of the die holder, said means comprising an annular step recess at the end face of the die holder for receiving the end face of the die, the radially outer surface of the annular step recess diverging conically outwardly in the direction of the die and defining a guiding surface, a series of peripherally spaced apart clamping segments interposed between said guiding surface and the periphery of said die, the radially outer and inner surfaces of the clamping segments respectively matching the conically divergent form of the guiding surface and the curvature of the end face of the die, spring means adapted to urge the clamping segments into clamping engagement with both said guiding surface and said die and auxiliary means actuatable to generate forces to oppose the forces generated by said spring means for disengaging said clamping segments, both the forces generated by said spring means and said auxiliary means being directed at angles α to the rotational axis of the die holder which are in the range between a value greater than zero and the angle of divergence of said guiding surfaces to produce radially outward movement of the clamping segments on disengagement thereof, members connecting said spring means and clamping segments being provided for transmitting said spring forces to the clamping segments, said members and auxiliary means being adapted to allow movement of the clamping segments in the direction of both said forces.

2. A pellet mill according to claim 1 and in which the angle α is the same as the angle of divergence of said guiding surfaces, equal to one half of the cone angle angle of the cone on which said guiding surfaces lie.

3. A pellet mill according to claim 1 in which, in respect of each clamping segment, the resultant of the forces generated by said spring means and said auxiliary means are aligned with a generatrix of a cone surface of cone angle 2α.

4. A pellet mill according to claim 1 and in which each of said clamping segments subtends an angle of less than 90° at the rotational axis of the die holder.

5. A pellet mill according to claim 4 and in which each clamping segment subtends an angle in the range 30° to 60° at the rotational axis of the die holder.

6. A pellet mill according to claim 5 and in which each clamping segment subtends an angle in the range 40 to 50° at the rotational axis of the die holder.

7. A pellet mill according to claim 6 and in which each clamping segment subtends an angle of substantially 45° at the rotational axis of the die holder.

8. A pellet mill according to claim 1 and in which said clamping segments are uniformly spaced around the periphery of the die.

9. A pellet mill according to claim 1 and in which each clamping segment is guided relative to the annular guiding surface at two points respectively located one to either side of its centre and that the force generated by said auxiliary means is applied to the centre of the imaginary line connecting the said two points.

10. A pellet mill according to claim 1 and in which the members for transmitting the forces generated by said spring means to the clamping segments comprises guiding members connected to the clamping segments and passing at the angle $\alpha$ through corresponding bores provided in the die holder, there being a sufficient clearance between the members and the bores to avoid binding of the members in the bores and wherein said spring means comprises springs interposed between the die holder and abutments on the members.

11. A pellet mill according to claim 10 and in which each of said members comprises a bolt the heads of the bolts defining said abutments.

12. A pellet mill according to claim 10 and in which each of said members comprises a cylindrical sleeve, the cylindrical sleeve being clamped to the clamping segments by respective bolts and the head of said bolts defining said abutments.

13. A pellet mill according to claim 10 and in which said spring means comprises a compression spring arranged around each member between the die holder and the associated abutment.

14. A pellet press according to claim 1 and in which said auxiliary means comprises a respective hydraulically actuated ram in respect of each clamping segment, the rams being arranged in respective cylinders fixedly arranged relative to the die holder and inclined at the angle $\alpha$ to the rotational axis thereof.

15. A pellet mill according to claim 14 and in which a single hydraulic ram is associated with each of said clamping segments.

16. A pellet press according to claim 14 and in which a respective resetting spring is associated with each said ram.

17. A pellet press according to claim 14 and in which the surface of each said clamping segment facing said ram is provided with a recess the end face of which is inclined at the angle $\alpha$ in order to provide a plane abutment surface for the front end face of the ram.

18. A pellet press according to claim 14 and in which the hydraulic cylinders are connected together by a common distribution line said distribution line being connectable to a source of hydraulic pressure.

19. A pellet mill according to claim 1 and in which additional screw-threaded safety fasteners are provided between the die and the die holder.

20. A pellet mill according to claim 1 and in which the length of the generatrix of the conical guiding surface of each clamping segment is greater than the length of the generatrix of its cylindrical clamping surface.

21. A pellet mill according to claim 1 and in which the end face of said die holder includes an annular flange member defining said annular step recess, the flange member being concentrically located on an annular end portion of said die holder by means of centering segments respectively located between at least some of the clamping segments, the centering segments having radially outer and inner surfaces respectively matching the conically divergent form of the guiding surface and the curvature of said annular surface, there being provided further spring means for urging the centering segments into locating engagement with both said guiding surface and said annular surface.

22. A pellet mill according to claim 21 and in which further guiding members are associated with said centering segments each guiding member passing through a respective bore provided in said annular flange member and being arranged at the angle $\alpha$ to the rotational axis of the die holder, said further spring means being operative between the annular flange member and abutments provided on said further guidance members.

23. A pellet mill according to claim 21 and in which said centering segments are uniformly spaced around the periphery of said annular step recess.

24. A pellet mill according to claim 21 and in which each said centering segments subtends an angle in the range 20° to 30° at the rotational axis of the die holder.

25. A pellet mill according to claim 24 and in which each said centering segment subtends an angle of substantially 25° at the rotational axis of the die holder.

26. A pellet mill according to claim 21 and in which three said centering segments are provided.

27. A pellet mill according to claim 26 and in which two said clamping segments are disposed between each adjacent pair of centering segments.

28. A pellet mill according to claim 14 and in which clearances are provided between the rams and the clamping segments prior to actuation of the auxiliary means.

29. A pellet mill according to claim 1 and in which the end face of said die holder includes an annular flange member defining said annular step recess, said annular flange member being secured to the die holder by screw-threaded fasteners arranged around the periphery of the annular flange member.

30. A pellet mill according to claim 21 and in which a clearance exists between each of the centering segments and the clamping segments and between the centering segments and the end face of the die when the die is clamped to the die holder.

* * * * *